(12) United States Patent
Rudolph et al.

(10) Patent No.: US 10,831,031 B2
(45) Date of Patent: Nov. 10, 2020

(54) SPECTACLE LENS FOR A DISPLAY DEVICE THAT CAN BE FITTED ON THE HEAD OF A USER AND GENERATES AN IMAGE AND DISPLAY DEVICE WITH SUCH A SPECTACLE LENS

(71) Applicant: tooz technologies GmbH, Aalen (DE)

(72) Inventors: Guenter Rudolph, Jena (DE); Hans-Juergen Dobschal, Kleinromstedt (DE)

(73) Assignee: tooz technologies GmbH, Aalen (DE)

(*) Notice: Subject to any disclaimer, the term of this patent is extended or adjusted under 35 U.S.C. 154(b) by 246 days.

(21) Appl. No.: 16/063,271

(22) PCT Filed: Dec. 12, 2016

(86) PCT No.: PCT/EP2016/080603
§ 371 (c)(1),
(2) Date: Jun. 16, 2018

(87) PCT Pub. No.: WO2017/102632
PCT Pub. Date: Jun. 22, 2017

(65) Prior Publication Data
US 2018/0373042 A1 Dec. 27, 2018

(30) Foreign Application Priority Data
Dec. 17, 2015 (DE) .................. 10 2015 122 131

(51) Int. Cl.
*G02B 27/01* (2006.01)

(52) U.S. Cl.
CPC .... *G02B 27/0172* (2013.01); *G02B 2027/013* (2013.01); *G02B 2027/0178* (2013.01)

(58) Field of Classification Search
CPC .......... G02B 27/0172; G02B 2027/013; G02B 2027/0178; G02C 7/086
See application file for complete search history.

(56) References Cited

U.S. PATENT DOCUMENTS

| 7,656,585 | B1 | 2/2010 | Powell et al. |
| 8,625,198 | B2 | 1/2014 | Berthelot |
| 2012/0057253 | A1 | 3/2012 | Takagi et al. |
| 2017/0045743 | A1 | 2/2017 | Dobschal et al. |
| 2017/0184851 | A1 | 6/2017 | Lindig et al. |

OTHER PUBLICATIONS

International Preliminary Report on Patentability rendered by the International Bureau of WIPO for PCT/EP2016/080603, dated Jun. 28, 2018, 14 pages.

*Primary Examiner* — Wen Huang
(74) *Attorney, Agent, or Firm* — Skaar Ulbrich Macari, P.A.

(57) ABSTRACT

A spectacle lens for a display device that can be fitted on the head of a user and generates an image, wherein the spectacle lens comprises a front side and a rear side, a coupling-in section and a coupling-out section spaced apart from the coupling-in section, which comprises several reflective deflecting surfaces arranged next to each other, which together form a reflective Fresnel surface, as well as a light-guiding channel which is suitable for guiding light bundles of pixels of the generated image, which are coupled into the spectacle lens via the coupling-in section of the spectacle lens, in the spectacle lens to the coupling-out section, by which they are coupled out of the spectacle lens, and wherein the distance of the reflective deflecting surfaces from the front side increases and/or decreases as the distance from the coupling-in section increases.

14 Claims, 3 Drawing Sheets

SPECTACLE LENS FOR A DISPLAY DEVICE THAT CAN BE FITTED ON THE HEAD OF A USER AND GENERATES AN IMAGE AND DISPLAY DEVICE WITH SUCH A SPECTACLE LENS

PRIORITY

This application claims the benefit of German Patent Application No. 102015122131.4 filed on Dec. 17, 2015, which is hereby incorporated herein by reference in its entirety.

FIELD

The present invention relates to a spectacle lens for a display device that can be fitted on the head of a user and generates an image with the features of the preamble of claim 1 and a display device with such a spectacle lens.

BACKGROUND

In spectacle lenses for display devices, the reflective deflecting surfaces are often arranged on the front side. The progression of the front side thus sets the arrangement of the reflective deflecting surfaces, which leads to difficult optical conditions, limiting the quality of the imaging of the spectacle lens for the light bundle.

SUMMARY

An object of the invention is to provide a spectacle lens such that it can provide improved imaging properties.

The disclosure includes a spectacle lens wherein the distance of the reflective deflecting surface from the front side increases and/or decreases as the distance to the coupling-in section increases.

In particular, the distance of the reflective deflecting surfaces from the front side increases or decreases as the distance from the coupling-in section increases.

The reflective deflecting surfaces are thus as a whole arranged inclined with respect to the front side and no longer need to follow the progression of the front side. The reflective deflecting surfaces can thereby be arranged such that the angle of incidence of the main beam of the light bundles is reduced, which benefits the correction of the imaging. The number of reflective deflecting surfaces in total can thereby also be reduced, which simplifies the manufacture of the spectacle lens.

The reflective deflecting surfaces can, in particular, be spaced apart from the front and rear sides.

In addition, the reflective deflecting surfaces can be arranged on a carrier surface which is not concentric with the front side. The carrier surface can, in particular, be formed flat or curved and be arranged inclined with respect to the front side.

In particular, the spectacle lens is free of a contact surface which extends over the entire thickness of the spectacle lens from the front side to the rear side.

The reflective deflecting surfaces can, for example, be formed on an insert which is inserted from the front side or from the rear side into a corresponding recess of the spectacle lens.

The front side and/or the rear side can be formed curved. In particular, the front and/or rear side is formed as a smooth, continuous surface.

At least one of the reflective deflecting surfaces can be formed flat. Additionally or alternatively, at least one of the reflective deflecting surfaces can be formed curved.

The spectacle lens can be formed from a plastic material. It is also possible for the spectacle lens to be formed from a glass material.

The reflective deflecting surfaces of the coupling-out section can also be referred to as reflective facets. The reflective facets can be arranged offset with respect to each other in the manner of a zigzag line or sawtooth line.

The reflective deflecting surfaces preferably do not extend over the entire thickness (extent from the front side to the rear side or along a thickness direction from the front to the rear side) of the spectacle lens but, for example, only over a part thereof. In particular, the reflective deflecting surfaces can be formed as buried reflective deflecting surfaces, with the result that they do not extend to the front side and/or to the rear side of the spectacle lens. The reflective deflecting surfaces can, for example, extend over 20 to 80% of the extent of the spectacle lens from the front side to the rear side. An extension in the range of from 30 to 70% or 40 to 60% of the thickness of the spectacle lens from the front side to the rear side is also possible.

In particular, the coupling-out section (preferably because of the reflective deflecting surfaces) can have a beam-deflecting and/or an imaging property.

At least one of the reflective deflecting surfaces can have a reflective coating. In the process, a reflectivity of almost 100% can be achieved. However, it is also possible to provide a lower reflectivity, with the result that the reflective surface can be used as a partially reflective surface.

In addition, it is possible to realize at least one of the reflective deflecting surfaces by total internal reflection.

The light guiding in the light-guiding channel can be effected, for example, by reflection on the front and rear sides of the spectacle lens. This can be a total internal reflection or a reflection because of a corresponding partially reflective or reflective coating. However, it is also possible for the guiding to be brought about by means of a reflective layer inside the spectacle lens. A reflective layer can be provided, with the result that the front or rear side acts as a further reflective surface. However, two reflective layers spaced apart from each other can also be provided.

The light-guiding channel can, in particular, guide light bundles of pixels of the generated image, which are coupled into the spectacle lens via the coupling-in section of the spectacle lens, in the spectacle lens to the coupling-out section.

The disclosure also includes a display device with a holder that can be fitted on the head of a user, an image-generating module, secured to the holder, which generates an image and an imaging optical system, secured to the holder, which comprises a spectacle lens according to the invention and, when the holder is fitted on the user's head, images this image such that the user can perceive it as a virtual image.

The imaging optical system can comprise the spectacle lens as the only optical element. However, it is also possible for the imaging optical system to comprise, in addition to the spectacle lens, at least one further optical element. The at least one further optical element can be formed, for example, in one piece with one of the two partial spectacle lenses.

The display device can comprise a control unit which actuates the image-generating module.

The image-generating module can, in particular, comprise a two-dimensional imaging system, such as e.g. an LCD module, an LCoS module, an OLED module or a tilting mirror matrix. The imaging system can comprise a plurality of pixels, which can be arranged e.g. in rows and columns. The imaging system can be self-luminous or not self-luminous.

The image-generating module can, in particular, be formed such that it generates a monochromatic or a multi-coloured image.

The display device according to the invention can comprise further elements known to a person skilled in the art, which are necessary for its operation.

It is understood that the features named above and those yet to be explained below can be used not only in the stated combinations but also in other combinations or alone, without departing from the scope of the present invention.

BRIEF DESCRIPTION OF THE DRAWINGS

In the following, the invention is explained in yet more detail by way of example with reference to the attached drawings, which also disclose features essential to the invention. There are shown in.

Figure 1:
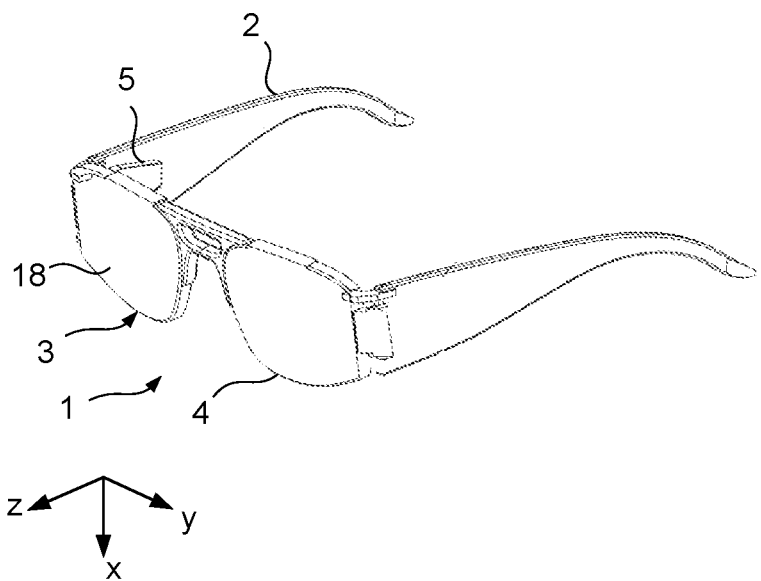
FIG. 1 a schematic perspective representation of an embodiment of the display device according to certain embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 according to an example of the invention comprises a holder 2 that can be fitted on the head of a user and can be formed e.g. in the manner of a conventional spectacles frame, as well as a first and a second spectacle lens 3, 4, which are secured to the holder 2. The holder 2 with the spectacle lenses 3, 4 can be formed e.g. as sports glasses, sunglasses and/or glasses for correcting defective vision, wherein a virtual image can be reflected into the user's field of view via the first spectacle lens 3, as is described below.

For this, the display device 1 comprises an image-generating module 5, which can be arranged in the area of the right-hand temple stem of the holder 2, as is represented schematically in FIG. 1. The image-generating module 5 can comprise a two-dimensional image-generating element 6 (FIG. 2), such as e.g. an OLED, an LCD or an LCoS chip or a tilting mirror matrix, with a plurality of pixels arranged e.g. in rows and columns.

The spectacle lenses 3 and 4, and in particular the first spectacle lens 3, are described, only by way of example, together with the display device 1 according to the invention. The spectacle lenses 3, 4, or at least the first spectacle lens 3, are in each case formed separately as a spectacle lens 3, 4 according to the invention or as an optical element according to the invention. The optical element according to the invention can also be used in a connection other than with the display device 1 described here. Therefore, when it is formed as a spectacle lens, the optical element can, of course, also be formed as the second spectacle lens 4.

Figure 2:
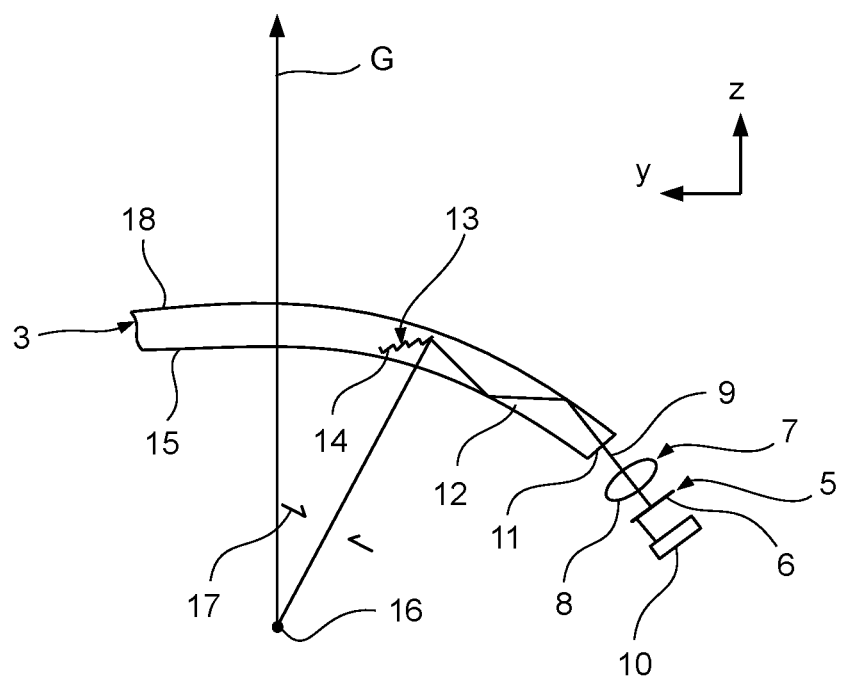
FIG. 2 an enlarged partial sectional view of the first spectacle lens including a schematic representation of the image-generating module.

As can best be seen from the enlarged, schematic partial sectional view in FIG. 2, the display device 1 comprises an imaging optical system 7 which contains an optical element 8 arranged between the image-generating element 6, or the imaging system 6, and the first spectacle lens 3. In addition, the first spectacle lens 3 itself also acts as part of the imaging optical system 7.

A light bundle 9 can emerge from each pixel of the imaging system 6. The desired image can be generated by correspondingly actuating the pixels of the imaging system 6 by means of a control unit 10, which can be part of the image-generating module 5. In FIG. 2, the beam path of a light beam (preferably of the main beam) is drawn in to represent the light bundles 9, with the result that the term light beam 9 is also used hereafter.

The light beam 9 emerging from the imaging system 6 runs through the optical element 8 and enters the first spectacle lens 3, via a coupling-in section 11, and is guided therein along a light-guiding channel 12 to a coupling-out section 13. The coupling-out section 13 comprises several reflective deflecting surfaces 14, on which a reflection of the light beams 9 in the direction of a rear side 15 of the first spectacle lens 3 takes place, with the result that the light beams 9 exit the first spectacle lens 3 via the rear side 15.

Thus, when a user is wearing the display device 1 according to the invention on his head as intended, he can perceive the image generated by means of the imaging system 6 as a virtual image when he looks at the coupling-out section 13. In the embodiment described here, the user must look approx. 40° to the right with respect to the direction of view G of a forward view. In FIG. 2, for the purpose of illustration, the centre of rotation 16 of the eye of the user, as well as the eyebox 17 or the exit pupil 17 of the imaging optical system 7 are drawn in. The eyebox 17 is the area which is provided by the display device 1 and in which the user's eye can move and he can still always perceive the generated image as a virtual image.

As is shown in the schematic representation in FIG. 2, both the rear side 15 and the front side 18 of the first spectacle lens 3 are formed curved.

The guiding of the light bundles 9 in the light-guiding channel 12 can be effected e.g. by total internal reflection on the front side 18 and the rear side 15. It is also possible for the front side 18 and/or the rear side 15 to have a reflective or partially reflective coating in the area of the light-guiding channel in order to bring about the desired light guiding.

Figure 3:
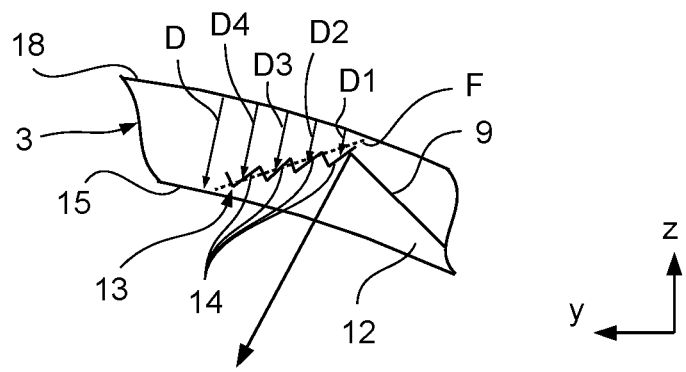
FIG. 3 an enlarged detailed representation of the coupling-out section from FIG. 2.

As is shown in the enlarged detailed representation of the coupling-out section 13 in FIG. 3, the coupling-out section comprises four reflective deflecting surfaces 14, which together form a reflective Fresnel surface F for the light bundles 9. The reflective Fresnel surface F is drawn in as a dashed line in FIG. 3 for illustration. Of course, the Fresnel surface F is not actually present as a continuous surface. The reflective deflecting surfaces 14 merely replicate the optical effect or the optical action, which such a Fresnel surface F would have if it were actually formed in the spectacle lens.

The individual reflective deflecting surfaces are arranged spaced apart from each other (in the direction of the propagation direction of the light bundles 9, for example) and, as a whole, are inclined with respect to the front side 18 or the rear side 15 of the spectacle lens 3. By this is meant here, in particular, that the distance of the individual reflective deflecting surfaces 14 from the front side 18 increases along a thickness direction D (the direction from the front side 18 to the rear side 15) as the distance from the coupling-in section 11 becomes greater. The distance D1 is thus smaller than the distance D2, which in turn is smaller than the distance D3. D3 is smaller than the distance D4. The distance can be measured, for example, in each case to the centre of the area, or centroid of the area, of the respective deflecting surface 14.

Through this virtually inclined arrangement of the Fresnel surface F formed by the reflective deflecting surfaces 14, the case of a slanted deflecting surface is better replicated. The individual reflective deflecting surfaces 14 can thereby be oriented, for example, such that their surface normal points in the direction of the respective main beams 9. The differences in optical path lengths between the individual reflective deflecting surfaces 14 can thereby be minimized, whereby a correction of the imaging of the whole optical system is made possible more simply.

Figure 4:
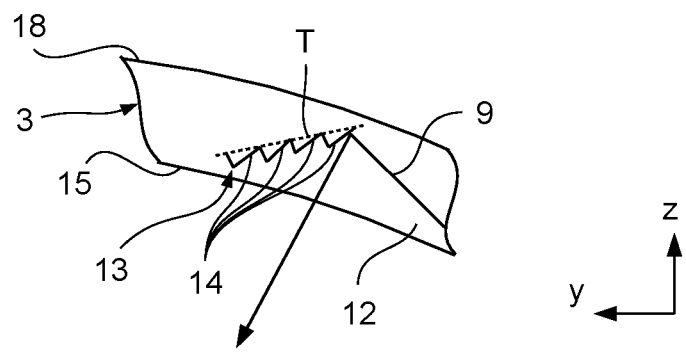
FIG. 4 an enlarged detailed representation of the coupling-out section from FIG. 2.

In FIG. 4, a carrier surface T is represented, against which the individual deflecting surfaces 14 abut. The carrier surface T is to be understood as a covered surface, which is not itself actually formed in the spectacle lens 3. Here, the carrier surface T is not curved, but a flat surface. However, it is arranged inclined with respect to the front side 18. The distance of the carrier surface T from the front side 18 thus increases as the distance from the coupling-in section 11 increases.

Figure 5:
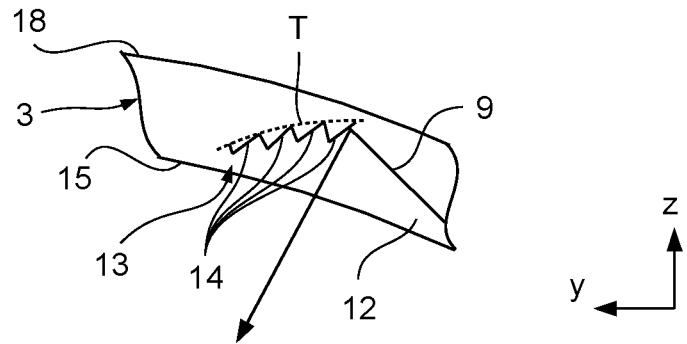
FIG. 5 an enlarged detailed representation of the coupling-out section from FIG. 2 according to a further embodiment, and FIG. 6 an enlarged detailed representation of the coupling-out section from FIG. 2 according to a further embodiment.

The carrier surface T does not have to be formed as a flat surface. It can also be formed curved, as is represented schematically in FIG. 5. The curvature can be spherical or aspherical. A formation as a freeform surface is also possible, which is thus curved but has no spherical curvature and also no aspherical curvature with rotational symmetry.

Figure 6:
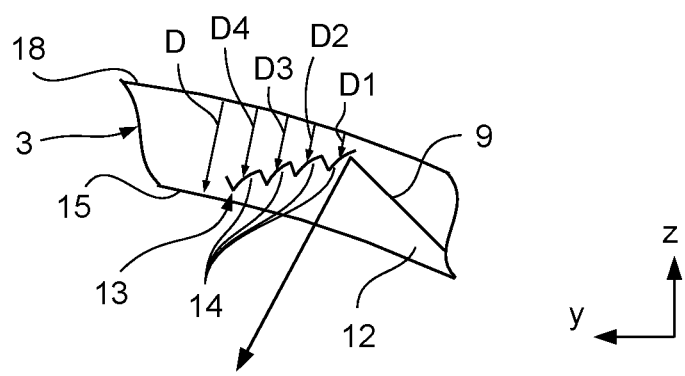

The deflecting surfaces 14 are shown as flat surfaces in the embodiments described hitherto. However, it is also possible for at least one of the deflecting surfaces 14 (or also all of them) to be curved in each case, as is represented schematically in FIG. 6. In this case too, the distance of the reflective deflecting surfaces 14 from the front side 18 increases as the distance from the coupling-in section 11 increases.

The reflective deflecting surfaces 14 can be part of a computationally determined surface and merely be arranged offset with respect to each other. In this case, the reflective deflecting surfaces could be reassembled as a continuous surface. Alternatively, it is possible for the reflective deflecting surfaces to be optimized individually with the result that, as a rule, they cannot be reassembled as a continuous surface.

As is represented in FIGS. 2 to 6, the distance of the reflective deflecting surfaces 14 from the front side 18 increases as the distance to the coupling-in section 11 increases in a plane which runs essentially perpendicularly to the front side 18 and rear side 15 (here, y-z plane). The Fresnel surface is thus inclined with respect to the front and/or rear side 18, 15 in the y-z plane.

Additionally or alternatively, the Fresnel surface can be inclined in a plane perpendicular to the plane of drawing of FIGS. 2 to 6. This plane runs essentially parallel to the front and rear sides 18, 15. This inclination can, in particular, be present such that it increases or decreases from top to bottom relative to the front side. The description top and bottom here relates in particular to the orientation when the display device is used as intended and e.g. is worn on the user's head.

Through the described inclined arrangement of the reflective deflecting surfaces 14 or the inclined arrangement of the Fresnel surface F, which is replicated by the reflective deflecting surfaces 14 in their optical action, the angles of incidence of the main beams 9 are reduced compared with known display devices in which the reflective deflecting surfaces are arranged, for example, on the front side 18, which benefits the correction of the imaging. The number of reflective deflecting surfaces 14 can also be reduced, which simplifies the production of the spectacle lens.

In the embodiment described here, the thickness of the spectacle lens 3 can be 4 mm, for example. However, the structure depth of an individual deflecting surface is only in the region of 0.45 mm, with the result that the described inclined arrangement of the reflective deflecting surfaces 14 is easily possible.

In particular, the radius of curvature of the carrier surface T can be left free as a parameter in the computational optimization of the imaging. This results in reflective deflecting surfaces 14 including arrangements thereof which can have improved properties.

In the display device 1 according to the invention, the reflection of the virtual image into the user's field of view is effected via the first spectacle lens 3. Of course, a reflection via the second spectacle lens 4 is also possible. In addition, the display device 1 can be formed such that items of information or virtual images are reflected in via both spectacle lenses 3, 4. The reflection can be effected such that a three-dimensional image impression forms. However, this is not absolutely necessary.

The spectacle lenses 3, 4 can have a refractive power of zero or a refractive power other than zero (in particular for correction of defective vision). As is shown in the figures, both the front side 18 and the rear side 15 are formed curved. The front side 18 is in particular spherically curved. If the spectacle lens 3, 4 has a refractive power other than zero, in order to correct defective vision, as a rule the curvature of the rear side 15 is chosen correspondingly, in order to achieve the corresponding correction. The rear side 15 can have a curvature deviating from the spherical shape.

The holder 2 does not have to be formed as a spectacles-type holder. Any other type of holder with which the display device can be fitted and worn on the head is also possible.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for a display device that can be fitted on the head of a user and generates an image, comprising:
   a front side;
   a rear side;
   a coupling-in section;
   a coupling-out section spaced apart from the coupling-in section, comprising several reflective deflecting surfaces arranged next to each other, which together form a reflective Fresnel surface; and
   a light-guiding channel which is suitable for guiding light bundles of pixels of the generated image, which are coupled into the spectacle lens via the coupling-in section of the spectacle lens, in the spectacle lens to the coupling-out section, by which they are coupled out of the spectacle lens,
   wherein the distance of the reflective deflecting surfaces from the front side at least one of increases and decreases as the distance from the coupling-in section increases, and
   wherein the reflective Fresnel surface is inclined such that a distance of the reflective deflecting surfaces from the front side increases or decreases in a direction from a top of the spectacle lens to a bottom of the spectacle lens.

2. The spectacle lens according to claim 1, wherein the distance of the reflective deflecting surfaces from the front side increases or decreases as the distance from the coupling-in section increases.

3. The spectacle lens according to claim 2, wherein the reflective deflecting surfaces are spaced apart from the front and rear sides.

4. The spectacle lens according to claim 1, wherein the reflective deflecting surfaces are arranged offset with respect to each other in the manner of a sawtooth line.

5. The spectacle lens according to claim 4, wherein the reflective deflecting surfaces are spaced apart from the front and rear sides.

6. The spectacle lens according to claim 1, wherein the reflective deflecting surfaces are spaced apart from the front and rear sides.

7. The spectacle lens according to claim 1, wherein the reflective deflecting surfaces are arranged on a carrier surface, which is not concentric with the front side.

8. The spectacle lens according to claim 7, wherein the carrier surface is curved.

9. The spectacle lens according to claim 1, wherein the reflective deflecting surfaces extend in a thickness direction from the front side to the rear side over at least 50% of a thickness of the spectacle lens.

10. The spectacle lens according to claim 1, wherein the spectacle lens is free of a contact surface which extends over the entire thickness of the spectacle lens from the front side to the rear side.

11. The spectacle lens according to claim 1, wherein the distance of the reflective deflecting surfaces from the front side increases as the distance from the coupling-in section increases.

12. The spectacle lens according to claim 1, wherein at least one of the reflective deflecting surfaces is formed curved.

13. The spectacle lens according to claim 1, wherein the spectacle lens is a plastic material.

14. A display device, comprising:
   a holder that can be fitted on the head of a user;
   an image-generating module, secured to the holder, which generates an image; and
   an imaging optical system, secured to the holder, which comprises a spectacle lens according to claim 1 and which, when the holder is fitted on the user's head, images the generated image such that the user can perceive it as a virtual image.

* * * * *